United States Patent Office 3,171,859
Patented Mar. 2, 1965

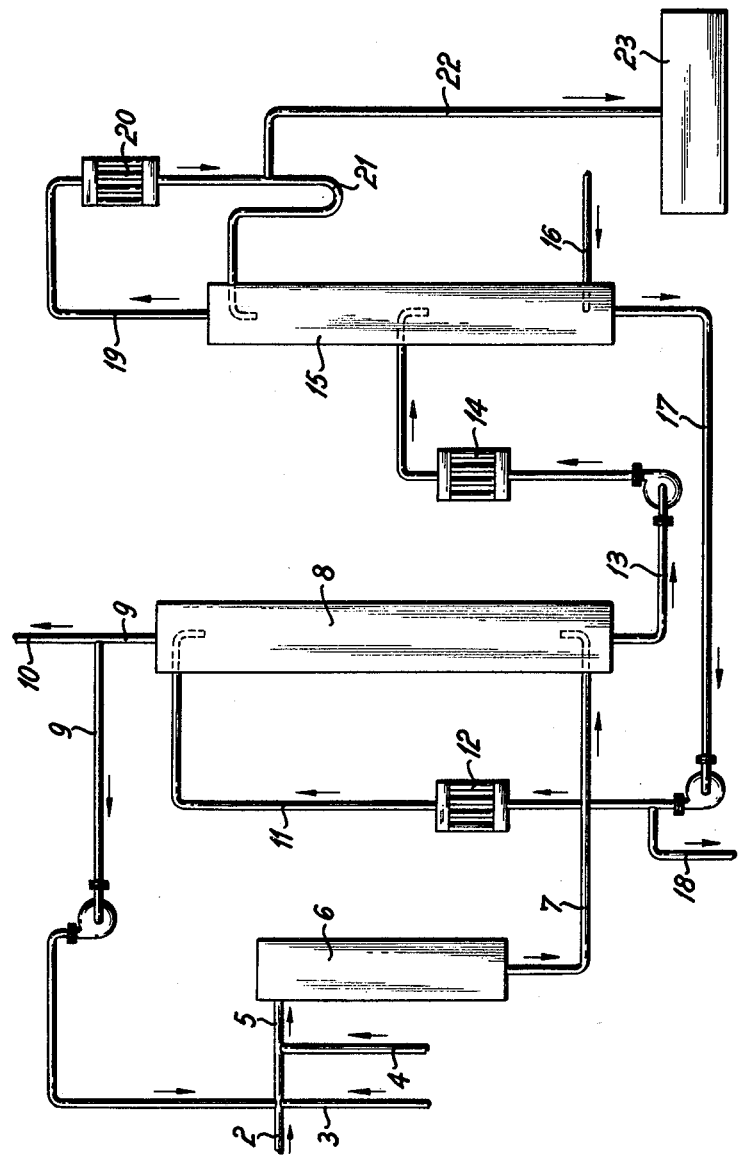

3,171,859
PROCESS FOR THE MANUFACTURE OF UNSATURATED ALDEHYDES OR KETONES
Kurt Sennewald, Knapsack, near Cologne, Klaus Gehrmann, Efferen, near Cologne, Wilhelm Vogt, Knapsack, near Cologne, and Stefan Schafer, Bruhl, near Cologne, Germany, assignors to Knapsack-Griesheim Aktiengesellschaft, Knapsack, near Cologne, Germany, a corporation of Germany
Filed Dec. 19, 1960, Ser. No. 76,696
Claims priority, application Germany, Dec. 19, 1959, K 39,473; July 8, 1960, K 41,151
10 Claims. (Cl. 260—604)

The present invention relates to a process for the manufacture of unsaturated aldehydes or ketones from corresponding olefins by air oxidation with the use of a catalyst containing bismuth oxide and molybdenum oxide; more especially, it relates to the manufacture of acrolein from propylene.

In the course of time, acrolein has become a valuable intermediate for making, for example, acrylic acid derivatives, allyl alcohol, hexane diol, hexane triol and other products. For this reason, attempts are being made to develop economical processes for making acrolein.

In known processes, acrolein is prepared by condensing formaldehyde and acetaldehyde, the acrolein being obtained in a yield of 70% to 80%. These processes use relatively costly and valuable starting materials. It has, therefore, been proposed that acrolein be prepared from cheap propylene and various such processes have already been described. Thus, for example, it has been proposed to oxidize propylene with the use of a catalyst consisting of bismuth oxide, phosphorus oxide, and molybdenum oxide; in another process, selenium is added to a copper oxide catalyst to improve the yield of acrolein.

In British specification 655,210, for example, is described the preparation of acrolein with the use of a copper catalyst. In this process considerable proportions of expensive selenium must be added to a mixture of propylene-oxygen-inert gas in order to obtain a satisfactory yield of acrolein, so that the process is rendered uneconomical. Furthermore, only very dilute gases containing about 2% propylene are used. After a single passage, the yield of acrolein amounts to 77% and the total yield, after complicated recovery and return of unreacted starting material, amounts to 84%.

In Belgian Patent 568,481, there is described a process for making unsaturated aldehydes and ketones, especially acrolein, wherein a catalyst is used to which no selenium, for example, must be added, but the yields obtained after single passage and the total yields of 57% and 72%, respectively, are relatively low. Still further processes also use copper oxide catalysts.

The present invention provides a process which unexpectedly permits making acrolein from propylene under relatively mild conditions, very good yields of acrolein being obtained.

The present invention provides more especially a process for making unsaturated aldehydes or ketones from corresponding olefins by air oxidation with the use of a catalyst containing bismuth oxide and molybdenum oxide, wherein the olefinic hydrocarbon, advantageously after the addition of steam, is treated with air and/or oxygen at a raised temperature and in the presence of a catalyst of the empirical formula $Fe_aBi_bP_cMo_dO_e$, in which (a) may be 0.1–12, (b) may be 0.1–12, (c) may be 0–10, (d) is about 12, and (e) may be 35–81. The elements bismuth, iron and molybdenum and optionally phosphorus are used in the catalyst in the form of their oxides. The catalyst may advantageously be applied on to a carrier, for example silicon dioxide or silica gel.

The catalyst is prepared by adding molybdenum oxide and, if desired, phosphoric acid to an aqueous solution of an iron salt and a bismuth salt, evaporating the resulting suspension together with colloidal silicon dioxide, for example, as carrier, and sintering the residue at an elevated temperature.

As bismuth salt there may be used, for example, bismuth nitrate and as iron salt, for example ferric nitrate. Instead of molybdenum oxide, there may also be employed ammonium molybdate, molybdenic acid or phosphorus molybdenic acid. The catalyst mass is advantageously sintered at temperatures of between about 300° and 560° C. Silicon dioxide as carrier for the catalyst may also be replaced by other inert materials, such as aluminum oxide, silicon carbide, metals or mixtures of such substances.

During oxidation, the temperatures are maintained at between about 230° and 500° C. and the pressures between about 0.1 atmosphere absolute and 10 atmospheres gauge. When the oxidation is carried out at atmospheric pressure, it is advantageous to use a temperature between 380° and 410° C.

The time during which the gaseous mixture of olefin and air is contacted with the catalyst varies between about 0.02 and 20 seconds, preferably between about 0.2 and 5 seconds, at the temperatures specified above. This time of stay is not critical. The reaction mixture contains, per mole olefinic hydrocarbon, about 0.1 to 2 mols oxygen, for instance in the form of air. The reaction mixture is also admixed, per mole olefinic hydrocarbon, with about 1 to 10 mols water in the form of steam as diluent.

In the optimum case, the reaction gas is composed as follows:

| | Mol percent |
|---|---|
| Propylene | 9.1 |
| Air | 46.7 |
| Steam | 44.2 |

The addition of steam if obligatory. Obviously, it acts not only as a diluent, but it also favors the reaction in that combustion to carbon oxides is substantially suppressed.

The process of this invention will generally be carried out in a reactor with the use of a solid bed catalyst, but a fluidized bed catalyst or flowing bed catalyst may also be used.

The process of this invention is especially suitable for making acrolein by oxidizing propylene. The invention also permits converting other olefins into their corresponding aldehydes or ketones.

The addition of a considerable proportion of iron oxide to a known catalyst consising of bismuth oxide, phosphorus oxide and molybdenum oxide involves the following advantages:

(1) Propylene can be oxidized at relatively low temperatures of between about 230° and 420° C.

(2) The proylene conversion can be considerably increased. At about 400° C., the rate of conversion is 70%, calculated on the propylene used.

(3) The yield of acrolein can be considerably improved. The yields obtained are as high as 84%, calculated on the amount of propylene which underwent reaction.

(4) The catalyst activity as compared with known processes is increased by about 10 times; the catalyst furnishes up to 400 grams acrolein per liter of catalyst and per hour.

According to a further embodiment of the present invention, the reaction vessel containing a catalyst of the general composition $Fe_aBi_bP_cMo_dO_e$ is charged with a mixture of propylene, oxygen, steam and a diluting gas, and the reaction mixture leaving the reaction vessel is subjected to a water wash, wherein the reaction mixture is freed by being washed with cold water conducted in counter-current from acrolein and by-products, such as acetaldehyde and acrylic acid. The cycle gas which consists of carbon oxides formed during the reaction and unreacted propylene is removed at the head of the reaction vessel, then admixed with fresh propylene, oxygen and steam and returned to the reaction vessel. The aqueous mixture discharged at the bottom of the water wash is introduced, if desired after preheating, into a steam-heated distillation stage, for example. The aqueous mass removed at the bottom of the distillation stage is cooled and then returned to the head of the water wash. Crude acrolein is discharged at the head of the distillation stage and then purified in known manner by distillation and dehydrated.

The additional carbon oxides evolved and hydrogen are removed after the water wash from the gas cycle which comprises reaction vessel and water wash. In analogous manner the amounts of water initially used are removed behind the distillation stage from the water cycle comprising water wash and distillation stage.

The process of this invention enables up to 99.5% of propylene to be converted and acrolein to be obtained in yields of up the 88%, calculated on the propylene, using a catalyst of the general formula $Fe_aBi_bP_cMo_dO_e$ without adding any activating or deactivating substance, by freeing the gas mixture leaving the reaction vessel from acrolein and recycling it into the reaction vessel after the amounts of propylene and oxygen consumed have been replenished. In view of the good yields obtained and the smooth reaction, none or only small amounts of carbon oxides are evolved during the reaction so that the proportion of off-gas is small. The off-gas only contains propylene in a proportion within the range of 0.5 to 1%, calculated on the propylene initially used. In addition thereto, the gas mixture used as starting material may contain propylene and oxygen in as high a concentration as about 15% of each substance. The reaction gas evolved therefore contains acrolein in a concentration of 6 to 8% by volume. Moreover, the catalysts are very active and furnish 150–400 grams per liter an hour of desired product, so that relatively small-dimensioned reaction vessels can be used.

The diluting gases used are the $CO_2$ and CO evolved during the reaction and steam. CO is predominantly evolved when a deficiency of oxygen is used. The CO and steam are partially converted into $H_2$ and $CO_2$.

It has unexpectedly been found that the catalysts used in the process of this invention also permit carrying out the process with the use of an excess of propylene and a deficiency of oxygen. In this variant, it is even possible to obtain better yields than with the use of an excess of oxygen, and to use the CO evolved and $H_2$ as diluting gases without oxygen being consumed by the combustion of CO and $H_2$ to $CO_2$ and $H_2O$. The selectivity of the catalysts ensures that the oxygen is almost exclusively used for propylene oxidation.

The off-gas obtained and withdrawn is combustible and its calorific values permit using it as energy generator in other stages of the process.

Propylene may be oxidized as stated above with the use of a solid bed or flowing bed reactor. The results indicated in the following examples were obtained with a solid bed reactor. The reaction vessel used comprises a U-shaped reaction space 1 inch in diameter and charged with the catalyst. The U-shaped reaction tube was in a furnace charged with liquid metal (tin, lead) or with molten salt.

The mixture of propylene, oxygen and inert gas was contacted with the catalyst for a period of time of between about 0.02 and 20 seconds, advantageously 0.1 and 2 seconds, at temperatures within the range of about 230° C. and 500° C., preferably about 380° C. and 420° C. and at pressures of between about 0.1 atmosphere absolute and 5 atmospheres gauge, advantageously atmospheric pressure. The time of contact of the reaction mixture with the catalyst and the composition of the reaction gas are not very critical. The reaction mixture may be composed as follows:

|  | Mol percent |
|---|---|
| Propylene | 15 |
| Oxygen | 9 |
| Carbon monoxide | 37 |
| Carbon dioxide | 31 |
| Hydrogen | 8 |

This composition is admixed, for example, with three times the amount of steam, calculated on propylene.

A mixture composed as follows may also be used, good yields being obtained:

|  | Mol percent |
|---|---|
| Propylene | 8 |
| Oxygen | 10 |
| Carbon monoxide | 30 |
| Carbon dioxide | 45 |
| Hydrogen | 7 |

This composition may be admixed, for example, with five times the amount of water, calculated on propylene. Steam must generally be added. It is used as additional diluent and simultaneously avoids to a considerable extent the combustion of propylene to carbon oxides.

The following scheme of flow is intended to illustrate the invention:

The reaction gas which contains acrolein and escapes from reaction vessel 6 is conducted hot via line 7 to wash tower 8 where it is washed with water to remove acrolein, acetaldehyde and acrylic acid, the two latter substances being obtained in small proportions as by-products. Part of the heat content of the gas mixture may be utilized in a heat exchanger. The off-gas emanating from the water wash and flowing through cycle line 9 is supplied with measured quantities of fresh propylene and oxygen via supply lines 2 and 3 to replenish the propylene and oxygen consumed. Steam is then added to the mixture via pipe 4 and the whole travels via collecting pipe 5 to reaction vessel 6 which is heated to a temperature of about 400° C. The additional carbon oxides obtained by propylene combustion are removed from the cycle via off-gas pipe 10 together with a small proportion of unreacted propylene. In the optimum case, the loss of propylene amounts to only about 0.5%, calculated on the propylene initially used. The aqueous acrolein solution is removed at the bottom of wash tower 8 and conducted via line 13 and steam-heated preheater 14 to stripping column 15, the sump of which is maintained at 100° C. by means of steam line 16 and in which the acrolein together with acetaldehyde is obtained in the form of an azeotropic mixture with water as head product having a temperature of about 52° C. This product is withdrawn via head line 19 equipped with cooler 20 and is partially returned via return line 21 to the head of column 15. A part of the crude product is withdrawn via overflow line 22 and conveyed to collecting vessel 23. The crude product so obtained is already very pure contrary to the crude product obtained in conventional processes. The composition of said product is approximately as follows:

|  | Percent by weight |
|---|---|
| Acrolein | 94.57 |
| Acetaldehyde | 2.33 |
| Propionaldehyde | 0 |
| Acetone | 0 |
| Water | 3.1 |

The material removed at the bottom of column 15 travels through lines 17 and 11 equipped with cooler 12 back to wash tower 8 which is operated at a temperature of about 20° C. Part of the material is removed through waste water line 18.

In order to avoid polymerization, stripping column 15 is stabilized with a small proportion of an aqueous hydroquinone solution.

The crude product obtained in collecting vessel 23 is further treated in known manner by distillative purification and dehydration of the acrolein which finally has a degree of purity of at least 99.7%. Extractive distillation which would be normally required is omitted in view of the fact that the crude product obtained contains neither acetone nor propionaldehyde.

The following examples serve to illustrate the invention, but they are not intended to limit it thereto:

*Example 1*

The catalyst used in the process of this invention was prepared as follows: A solution of 218 grams $$Bi(NO_3)_3 \cdot 5H_2O$$

and 20 cc. concentrated $HNO_3$ in 150 cc. of water was added together with a solution of 182 grams $$Fe(NO_3)_3 \cdot 9H_2O$$

in 100 cc. of water to 1600 grams of a 14% aqueous colloidal silicon dioxide solution, and the whole was admixed with 11.8 grams $H_3PO_4$ of 85% strength and 173 grams $MoO_3$.

The mixture obtained was evaporated to dryness while stirring and sintered for 5 hours at 460° C. in a current of air. The lumpy mass was comminuted and then sieved to obtain particles having a grain size of about 3 mm.

150 cc. of the catalyst so prepared were introduced into a U-shaped tube 1 inch in diameter (reactor) which was in a furnace charged with liquid tin. During the reaction, this reactor was maintained at about 390–400° C. at atmospheric pressure. The apparent time of contact amounted to 0.6 second.

When 1.33 mols propylene per hour were put through together with 6.85 mols air and 6.5 mols steam per hour, about 70% of the propylene underwent conversion. The yield of acrolein was 84%, calculated on the amount of propylene reacted. Unreacted propylene could be used again. Traces of acetaldehyde and small proportions of acrylic acid and acetic acid were obtained as by-products in a total yield of about 6%. The rest of reacted propylene was converted to carbon oxides and water. The catalyst activity was 347 grams acrolein per liter of catalyst per hour.

*Example 2*

250 cc. of a catalyst having the composition $$Fe_7Bi_2PMo_{12}O_{52}$$

containing 35% by weight silica gel as carrier were introduced into a U-shaped tube 1 inch in diameter (reactor) which was in a furnace charged with liquid tin. During the reaction the reaction vessel was maintained at about 400° C. at atmospheric pressure. 44.5 grams=1.06 mols propylene were added per hour to the cycle gas. Oxygen was added in a proportion such that the cycle gas had the following composition:

| | Mol percent |
|---|---|
| Propylene | 12.7 |
| Oxygen | 6.5 |
| Carbon monoxide | 45.8 |
| Carbon dioxide | 30.0 |
| Hydrogen | 5.9 |

Prior to being reacted, this cycle gas was admixed with steam in a proportion such that the molar ratio of propylene to steam was 1:3.

The quantity of gas cycled was 600 liters per hour, the time of contact 0.5 second. The resulting reaction gas was removed from the furnace and then subjected to a water wash in a unit, which in this example consisted of a column containing 10 bubble trays.

3 liters of water were introduced per hour into the head of said column. The aqueous acrolein solution withdrawn travelled to the middle section of a stripping column (in the instant example a packed column 2 meters long) from which the acrolein was removed as head product having a temperature of about 52° C. together with the water distilling off azeotropically, and condensed. 54.9 grams=0.925 mol of 94.4% acrolein were obtained per hour. The yield of acrolein amounted to 87.3%, calculated on the propylene initially used.

The carbon oxides evolved by propylene combustion were removed as off-gas together with the propylene proportions contained in the reaction gas. 2 liters off-gas composed as follows were obtained per hour:

| | Mol percent |
|---|---|
| Propylene | 9.2 |
| Oxygen | 1.7 |
| Carbon monoxide | 49.7 |
| Carbon dioxide | 33.5 |
| Hydrogen | 5.9 |

The losses of propylene caused by the off-gas amounted only to 0.71%, calculated on the propylene initially used.

*Example 3*

100 cc. of a catalyst having the composition $$Fe_{14}Bi_4Mo_{24}O_{99}$$

containing 35% by weight silica gel as carrier were introduced into the reaction vessel described in Example 1.

During the reaction, the catalyst was maintained at 390° C. 19.45 grams=0.463 mol propylene were added per hour to the cycle gas. Oxygen was added so that the cycle gas contained:

| | Mol percent |
|---|---|
| Propylene | 12 |
| Oxygen | 7 |
| Carbon monoxide | 39 |
| Carbon dioxide | 36 |
| Hydrogen | 6 |

Finally, the cycle gas was admixed with steam in a proportion such that the molar ratio of propylene to steam was about 1:2. When 300 liters gas were cycled per hour at a contact time of 0.9 second, there were obtained 23.9 grams of 92% crude acrolein or 0.393 mol. The yield of acrolein was, therefore, 84.9%.

*Example 4*

250 cc. of a catalyst having the composition $$Fe_7Bi_2P_3Mo_{12}O_{57}$$

containing 35% by weight silica gel as carrier were used under the same reaction conditions as described in Example 1.

Propylene was added to the cycle gas in an amount of 49.3 grams=1.173 mol per hour.

57.7 grams of 93.6% crude acrolein or 0.965 mol were obtained per hour. The yield, therefore, amounted to 82.2%.

*Example 5*

700 cc. of a catalyst having the composition $$Fe_7Bi_2PMo_{12}O_{59}$$

containing 35% by weight silica gel as carrier were introduced into an annular reaction space shaped as hollow cylinder which had a contact space 8 mm. wide and was in a furnace charged with liquid tin.

The reaction temperature was 400° C. at atmospheric pressure. 79 grams propylene=1.88 mols were added per hour to the cycle gas. Oxygen was added so that the cycle gas was composed as follows:

|  | Mol percent |
|---|---|
| Propylene | 9.7 |
| Oxygen | 4.1 |
| Carbon monoxide | 46.3 |
| Carbon dioxide | 34.7 |
| Hydrogen | 5.2 |

This gas mixture was still further admixed before the reaction vessel with steam in a proportion such that the molar ratio of propylene to steam was 1:4.2.

1200 liters of gas were cycled per hour and the contact time was 0.6 second. After water wash and subsequent distillation of the aqueous solution, there were obtained 96.8 grams crude acrolein per hour. The crude product contained 94% acrolein. The yield was, therefore, 86.3%.

We claim:

1. A process for the manufacture of acrolein, which comprises treating propylene in the presence of steam with a gas selected from the group consisting of air, oxygen and mixtures thereof at temperatures between about 230° C. and 500° C. and pressures between about 0.1 atmosphere absolute and 10 atmospheres gauge in the presence of a catalyst of the empirical formula $Fe_aBi_bP_cMo_dO_e$, wherein ($a$) is 0.1 to 12, ($b$) is 0.1 to 12, ($c$) is 0 to 10, ($d$) is about 12, and ($e$) is 35 to 81, the elements Fe, Bi, P and Mo being present in the form of their oxides.

2. A process as claimed in claim 1, wherein the catalyst of the empirical formula $Fe_aBi_bP_cMo_dO_e$ is applied to a carrier selected from the group consisting of silicon dioxide, aluminum oxide, and silicon carbide.

3. A process as claimed in claim 1, wherein the gas mixture is contacted with the catalyst for a period of time of between about 0.02 second and 20 seconds.

4. A process as claimed in claim 1, wherein the reaction mixture contains, per mol propylene, about 0.1 to 2 mols oxygen and about 1 to 10 mols water in the form of steam.

5. A process as claimed in claim 1, wherein the reaction vessel containing the catalyst is charged with a starting gas-mixture consisting of propylene, oxygen, steam and a diluting gas consisting of CO, $CO_2$ and hydrogen, the reaction mixture leaving the reaction vessel is conducted to a counter current cold water wash, where it is freed from acrolein acetaldehyde and acrylic acid, while cycle gas consisting of carbon oxides evolved during the reaction, hydrogen and unreacted propylene is removed at the head of the water wash and admixed with fresh propylene, oxygen and steam and again introduced into the reaction vessel, the aqueous mixture withdrawn at the bottom of the water wash is introduced into a distillation stage, the aqueous material withdrawn at the bottom of said distillation stage is cooled and returned to the head of the water wash, and crude acrolein is removed at the head of the distillation stage, purified by distillation and dehydrated.

6. A process as claimed in claim 5, wherein additional carbon oxides evolved and hydrogen are removed after the water wash from the gas cycle comprising the reaction vessel and the water wash.

7. A process as claimed in claim 5, wherein the water initially used is removed after the distillation stage from the water cycle comprising the water wash and distillation stage.

8. A process as claimed in claim 5, wherein the starting gas-mixture consisting of propylene, oxygen, steam and the diluting gas contains propylene and oxygen in a concentration of up to about 15% by volume of each substance.

9. A process as claimed in claim 5, wherein the starting gas-mixture consisting of propylene, oxygen, steam and a diluting gas contains less oxygen than propylene.

10. A process as claimed in claim 5, wherein a small proportion of hydroquinone as a polymerization-inhibiting substance is added to the distillation stage.

References Cited in the file of this patent

UNITED STATES PATENTS 2,941,007     Callahan et al.            June 14, 1960